3,204,235
POSITION MEASURING APPARATUS
Adrian L. De Rosa, Las Cruces, N. Mex., assignor of one-half to Richard M. Schwartz, Las Cruces, N. Mex.
Filed Oct. 23, 1962, Ser. No. 232,443
1 Claim. (Cl. 340—347)

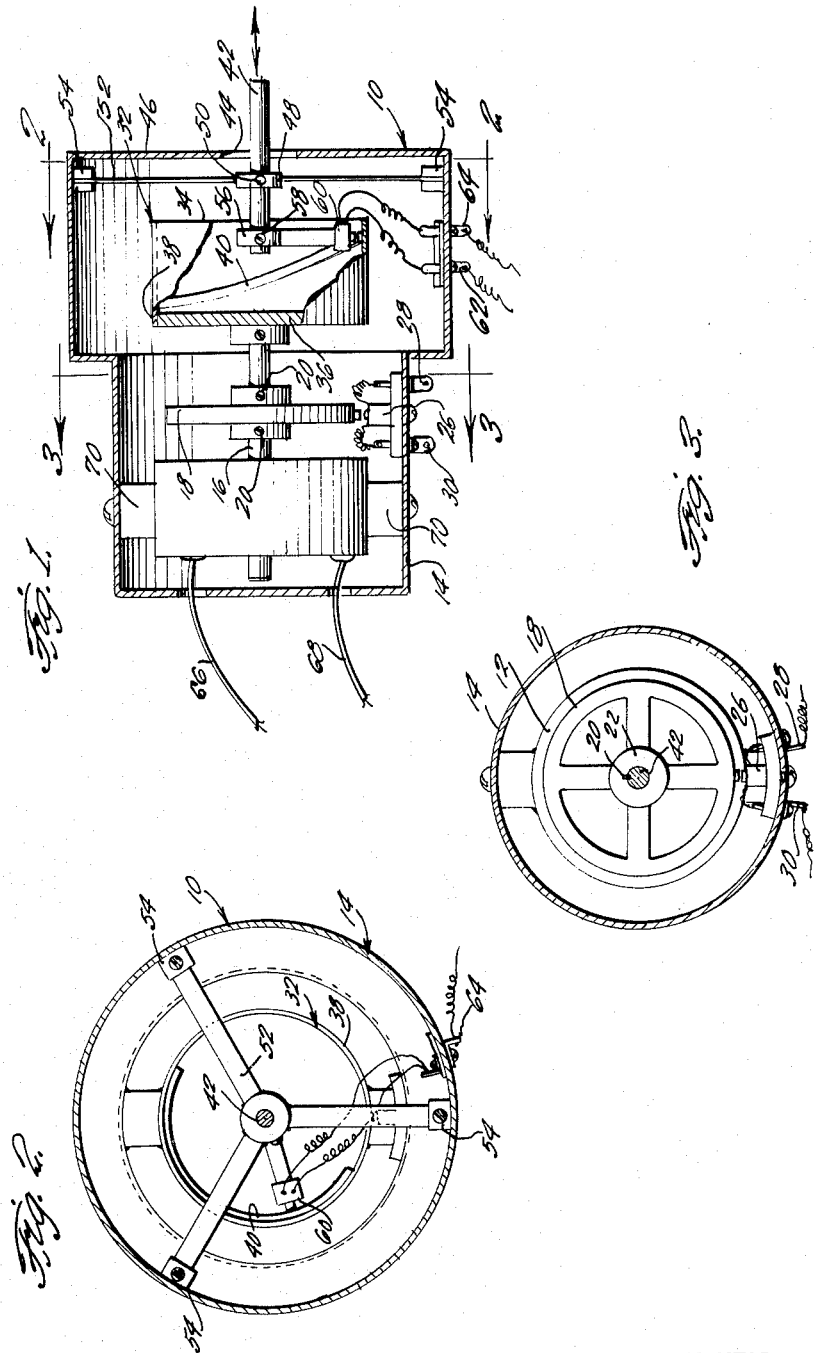

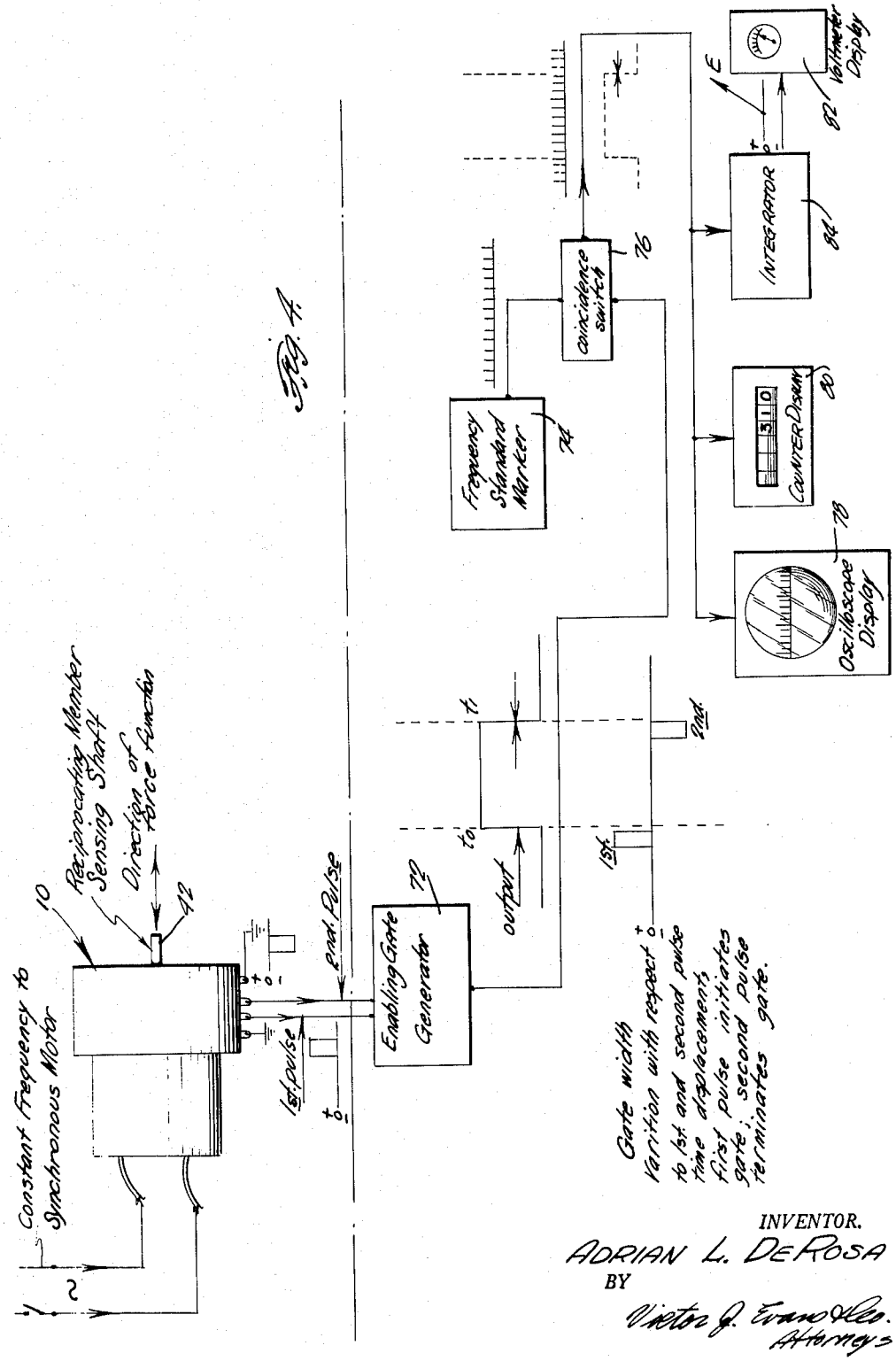

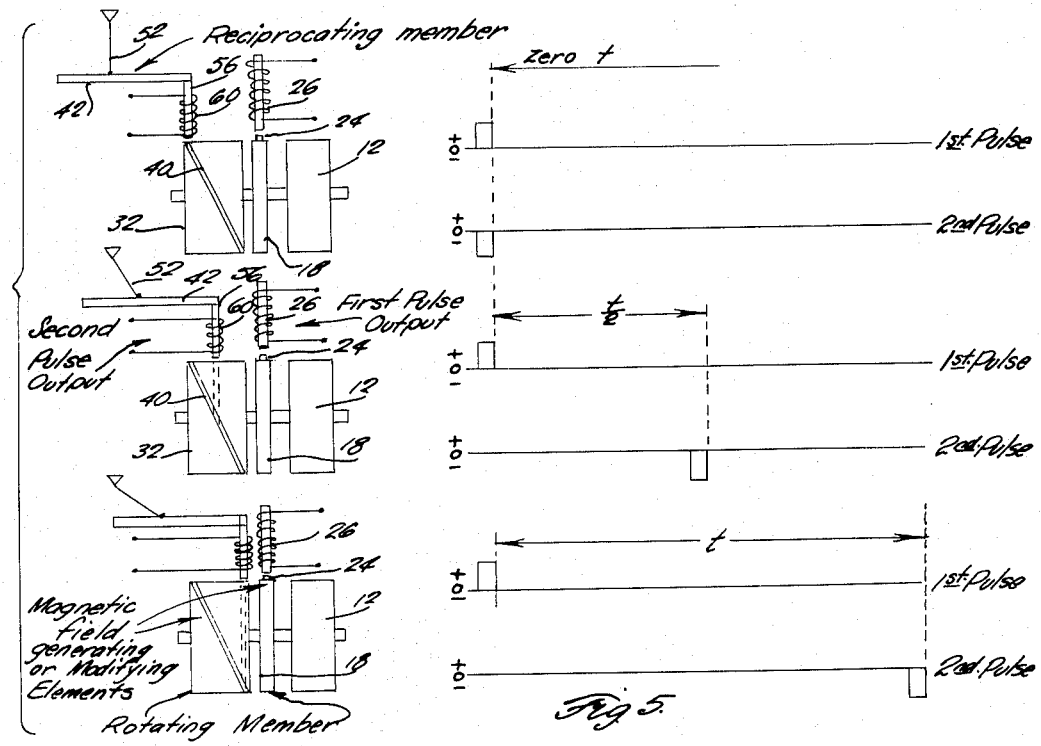
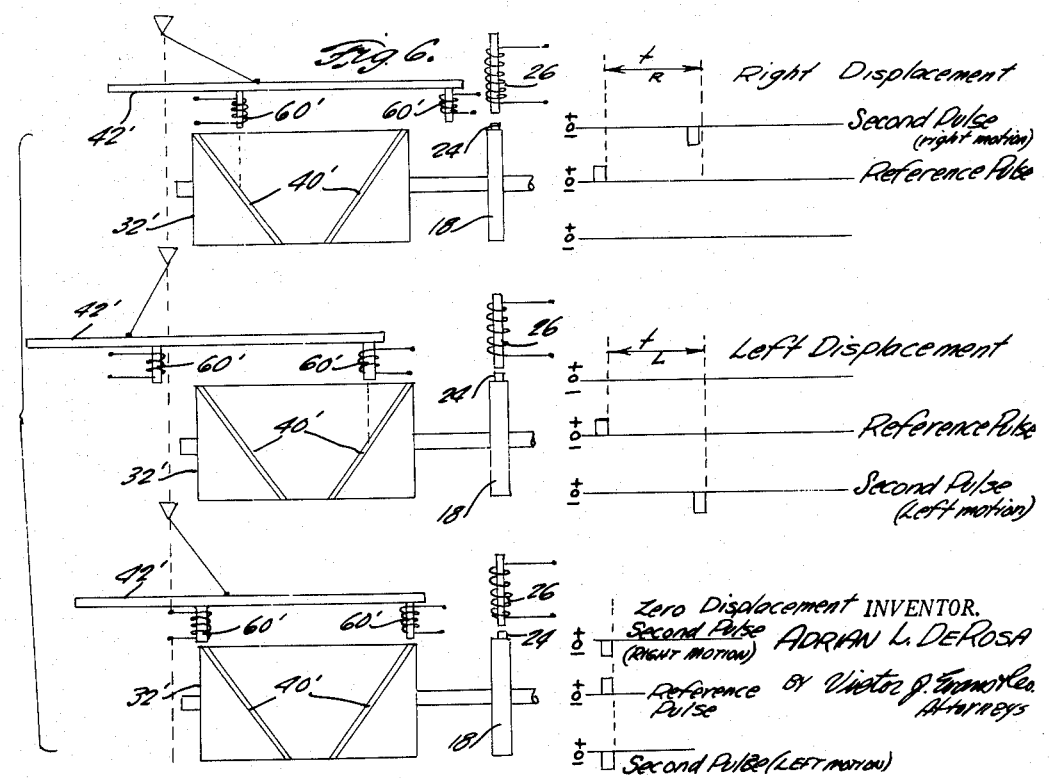

The present invention relates to a position measuring device for electrically indicating, recording, or reproducing physical or mechanical magnitudes or conditions including departures or displacement of devices in general, and relates more particularly to an apparatus in which a pair of electrical pulses are generated by the position measuring apparatus, the pulses being available for digital display or electronic count of the magnitude of the physical displacement sensed by the apparatus.

An object of the present invention is to provide a new and novel position indicating apparatus.

Another object of the present invention is to provide an apparatus for measuring electronically the linear displacement of a shaft or other body.

A still further object of the present invention is to provide a position measuring apparatus using techniques which are primarily electromagnetic.

And yet another object of the present invention is to provide a position measuring apparatus which lends itself to production at reasonable cost, one which may be employed with an electronic or mechanical counter, an oscilloscope, or other electronic equipment for sensing and displaying the displacement of a moving body.

These and other objects and advantages of the present invention will be fully apparent from the following description when taken in connection with the annexed drawings, in which:

FIGURE 1 is a view partially in section with parts broken away of the apparatus according to the present invention, FIGURE 2 is a view taken on the line 2—2 of FIGURE 1, FIGURE 3 is a view taken on the line 3—3 of FIGURE 1, FIGURE 4 is a schematic view of a circuit employed with the apparatus of the present invention, FIGURE 5 is a schematic view showing the operation of the apparatus, and FIGURE 6 is another schematic view showing a modified form of the apparatus.

Referring in detail to the drawings in which like numerals indicate like parts throughout the several views, in FIGURE 1, the apparatus is designated generally by the numeral 10 and it includes a motor 12 mounted in a housing 14, the motor being of the synchronous type.

The motor 12 has a shaft 16 projecting from both ends and a disc 18 is secured to the shaft 16 by means of set screws 20 which extend through a hub portion 22 of the disc 18.

On the periphery of the disc 18 is a magnetic element 24. Affixed to the inner wall of the housing 14 is a transducer 26 having electrical connectors 28 and 30 associated therewith and mounted on the exterior wall of the housing 14.

Also mounted on the shaft 16 and spaced from the disc 18 is a drum 32 open at one end, as at 34, and closed by a disc 36 at the other end which supports the wall 38 of the drum 32.

On the inner face of the wall 38 of the drum 32 is a narrow strip 40 of a magnetic material shaped in the form of a helix and extending from the open end 34 of the drum 32 to the disc 36. The strip 40 is continuous and is sloped for 180 degrees of the drum in one direction and 180 degrees of the drum in the other direction.

A rod or shaft 42 has a portion adjacent one end extending through an opening 44 provided in the end wall 46 of the housing 14. Inwardly of the adjacent end of the shaft 42 is a collar 48 secured to the shaft 42 by means of a set screw 50. The collar 48 is secured to the midpart of a flexible spider 52 which is mounted on the inner wall of the housing 14 by means of three brackets 54, as shown most clearly in FIGURE 2.

The shaft 42 projects into the open end 34 of the drum 32 and carries thereon an arm 56 secured to the shaft 42 by means of a set screw 58. On the free end of the arm 56 is another transducer 60 electrically in circuit with connectors 62 and 64 which are mounted on the wall of the housing 14 as shown most clearly in FIGURE 1.

Wires 66 and 68 connect the motor 12 to a source of electrical energy and struts 70 support the motor 12 within the housing 14.

In use, the motor 12 is energized and the disc 18 is caused to rotate at a constant selected speed. The magnetic element 24, of any suitable type, passes in registry with the transducer 26 so as to generate an electric pulse at a regular time interval. The time intervals are a function of the revolutions per second of the disc 18.

With reference to the upper portion of the FIGURE 5 of the drawings, it will be seen that the transducer 60 is in a position with reference to the strip 40 so as to generate a pulse at the same time as the transducer 26.

In the middle portion of FIGURE 5 there will be seen another condition in which the shaft 42 has been shifted along its longitudinal axis toward the disc 18. This results in the pulses being generated at the same rate but not at the same time since the transducer 60 intercepts the strip 40 at a time later than the transducer 26 intercepts the element 24.

In the lower portion of FIGURE 5 still another condition is shown in which the shaft 42 is at the limit of its movement toward the disc 18 and the transducer 60 in a position so as to intercept the tape 40 at the limit of the tape helix. This results in the first and second pulses being generated at the same rate but at a greater time interval than previously described.

In the right hand portion of FIGURE 5 there is shown a relative displacement of the first and second pulses for each of the three conditions above described.

With reference to FIGURE 6, a modified form of the apparatus is shown in which the drum 32' is provided with two strips 40' and the shaft 42' is provided with two transducers 60' arranged so that for a right displacement of the shaft 42' the time pulses are shown as in the upper part of FIGURE 6 and for a left displacement the time pulses are shown in the middle portion of FIGURE 6. In the lower portion of FIGURE 6 the transducers 60' are in a position to indicate by their pulses a zero displacement of the shaft 42'.

It is to be noted that the transducers 26 and 60 may be any of electronic equipment which senses a magnetic field generated by or senses a change in a steady state magnetic field when said magnetic field is modified by the passage of the element 24 or the adjacent portion of the strip 40. Similarly, the strip 40 may be of any material and it may be in the form of filament secured to the inner wall of the drum 32 or a magnetic or magnetic field modifying material such as a sintering formed integrally with the drum 32 as in the shape of a magnetic tape.

Also, while the strip 40 is illustrated as a 180 degree helix it may be of any form desired and may be 360 degrees of the drum 30 or may have various configurations to provide linear, exponential, or logarithmic output of the pulse time separations as a function of position displacement of the reciprocating shaft 42, as required by the particular situation in which the apparatus of the present invention is to be employed.

In FIGURE 4 a use of the apparatus 10 is shown in which the output of the transducers 26 and 60 are fed to an enabling gate generator 72 and the output therefrom is combined with a signal from a frequency standard marker 74 through a switch 76 of conventional construction. This results in a signal which may be used with an oscilloscope display 78, a counter display 80, or with a volt meter display 82 which is connected in circuit with the switch 76 through an integrater 84.

As will be understood by those skilled in the art, other uses will be found for the apparatus 10 and numerous changes and modifications may be made in the apparatus 10 without departing from the spirit thereof as set forth in the appended claim.

What is claimed is:

A position measuring apparatus comprising a rotatable shaft, a disc mounted on said shaft for rotation therewith, a magnetic element carried on the periphery of said disc, a first transducer in registry with the path of said element, said transducer being adapted to generate a first pulse responsive to rotation of said disc, a drum mounted on said shaft for rotation therewith, an endless helically arranged magnetic member extending about said drum, a second transducer carried by a second shaft and disposed so as to intercept a portion of said magnetic member and being adapted to generate a second pulse responsive to movement of said second shaft, a gate generator connected to said transducers for producing an output signal initiated in response to said first pulse and terminated in response to said second pulse, and means mounting said shaft for linear movement relative to the axis of said drum.

References Cited by the Examiner
UNITED STATES PATENTS
2,597,866    5/52    Gridley _____ 340—347

MALCOLM A. MORRISON, *Primary Examiner.*